United States Patent
Schönen et al.

(10) Patent No.: US 8,950,766 B2
(45) Date of Patent: Feb. 10, 2015

(54) AXLE SUSPENSION WITH LONGITUDINAL LEAF SPRING FOR A MOTOR VEHICLE

(71) Applicants: Benteler Automobiltechnik GmbH, Paderborn (DE); Benteler SGL GmbH & Co. KG, Paderborn (DE)

(72) Inventors: Stephan Schönen, Paderborn (DE); Hendrik Reineke, Bad Driburg (DE); Ulrich Müller, Langweid am Lech (DE); Jan Kurz, Ried im Innkreis (AT); Johannes Böke, Blomberg (DE); Rodscha Drabon, Salzkotten (DE); Armin Zuber, Paderborn (DE)

(73) Assignees: Benteler-Automobiltechnik GmbH, Paderborn (DE); Benteler SGL GmbH & Co. KG, Paderborn (DE)

( * ) Notice: Subject to any disclaimer, the term of this patent is extended or adjusted under 35 U.S.C. 154(b) by 0 days.

(21) Appl. No.: 13/779,053

(22) Filed: Feb. 27, 2013

(65) Prior Publication Data

US 2013/0228992 A1   Sep. 5, 2013

(30) Foreign Application Priority Data

Mar. 1, 2012 (DE) .......................... 10 2012 101 730

(51) Int. Cl.
*B60G 11/04* (2006.01)
*B60G 11/113* (2006.01)
(Continued)

(52) U.S. Cl.
CPC ............... *B60G 11/02* (2013.01); *B60G 11/04* (2013.01); *B60G 11/113* (2013.01); *F16F 1/368* (2013.01); *B60G 2200/30* (2013.01); *B60G 2202/112* (2013.01); *B60G 2204/121* (2013.01); *B60G2206/428* (2013.01); *B60G 2206/7101* (2013.01); *B60G 2206/8101* (2013.01); *B60G 2206/821* (2013.01)
USPC ............................... 280/124.175; 280/124.17

(58) Field of Classification Search
USPC ......... 280/124.17, 124.175; 267/36.1, 40, 47, 267/148, 149
See application file for complete search history.

(56) References Cited

U.S. PATENT DOCUMENTS 3,022,991 A   2/1962  Billard
3,061,301 A  10/1962  Bajer et al.
(Continued)

FOREIGN PATENT DOCUMENTS

CA      2022028       2/1991
DE    102 60 062      7/2003
(Continued)

OTHER PUBLICATIONS

Machine translation of Priority document.*

*Primary Examiner* — Ruth Ilan
*Assistant Examiner* — Barry Gooden, Jr.
(74) *Attorney, Agent, or Firm* — Henry M. Feiereisen LLC

(57) ABSTRACT

An axle suspension for a motor vehicle includes a longitudinal leaf spring made of fiber composite and having ends coupled to the motor vehicle. The leaf spring has an attachment zone and two arms which extend from the attachment zone to the ends of the leaf spring to define a trailing arm and a leading arm in a travel direction of the motor vehicle, with the trailing arm having a cross sectional dimension which is greater than a cross sectional dimension of the leading arm. A clamping device couples an axle component to the leaf spring substantially in midsection of the leaf spring and is arranged offset in longitudinal direction from the midsection of the leaf spring.

13 Claims, 3 Drawing Sheets

(51) Int. Cl.
*B60G 11/10* (2006.01)
*B60G 11/02* (2006.01)
*F16F 1/368* (2006.01)

(56) References Cited

U.S. PATENT DOCUMENTS

| | | | | |
|---|---|---|---|---|
| 3,250,546 | A | * | 5/1966 | Allison ................. 280/124.176 |
| 3,900,357 | A | * | 8/1975 | Huchette et al. .............. 156/185 |
| 3,968,958 | A | | 7/1976 | Huchette et al. |
| 4,621,834 | A | * | 11/1986 | Aubry et al. ........... 280/124.165 |
| 4,707,317 | A | | 11/1987 | Epel et al. |
| 4,750,718 | A | * | 6/1988 | Nickel ............................ 267/49 |
| 4,802,659 | A | * | 2/1989 | Hope ............................ 267/149 |
| 4,886,254 | A | * | 12/1989 | Carpentier et al. ........... 267/148 |
| 4,894,108 | A | * | 1/1990 | Richard et al. ................ 156/245 |
| 6,012,709 | A | | 1/2000 | Meatto et al. |
| 6,029,987 | A | * | 2/2000 | Hoffman et al. ....... 280/124.171 |
| 6,530,562 | B1 | | 3/2003 | Sutton et al. |
| 7,017,888 | B2 | * | 3/2006 | Platner et al. ................ 267/36.1 |
| 7,032,624 | B2 | * | 4/2006 | Bruske et al. .................... 139/57 |
| 7,722,065 | B2 | * | 5/2010 | Platner et al. .......... 280/124.175 |
| 2002/0153648 | A1 | * | 10/2002 | Lawson ........................ 267/148 |
| 2002/0167121 | A1 | * | 11/2002 | Greco .......................... 267/36.1 |
| 2005/0051934 | A1 | * | 3/2005 | Platner et al. .................... 267/47 |
| 2010/0044991 | A1 | * | 2/2010 | Luna ...................... 280/124.175 |
| 2013/0001845 | A1 | | 1/2013 | Voigt et al. |

FOREIGN PATENT DOCUMENTS

| | | |
|---|---|---|
| DE | 10 2007 017 991 A1 | 10/2008 |
| DE | 10 2009 021 840 B3 | 11/2010 |
| DE | 102010009528 | 9/2011 |
| EP | 0 178 286 | 4/1986 |
| EP | 1 980 425 A1 | 10/2008 |
| JP | S 63-251638 A | 10/1988 |

* cited by examiner

AXLE SUSPENSION WITH LONGITUDINAL LEAF SPRING FOR A MOTOR VEHICLE

CROSS-REFERENCES TO RELATED APPLICATIONS

This application claims the priority of German Patent Application, Serial No. 10 2012 101 730.1, filed Mar. 1, 2012, pursuant to 35 U.S.C. 119(a)-(d), the content of which is incorporated herein by reference in its entirety as if fully set forth herein.

BACKGROUND OF THE INVENTION

The present invention relates to an axle suspension for a motor vehicle.

The following discussion of related art is provided to assist the reader in understanding the advantages of the invention, and is not to be construed as an admission that this related art is prior art to this invention.

The use of leaf springs is generally known for application in axle suspensions of motor vehicles. The leaf springs are either arranged as transversal leaf springs transversely to the travel direction of the motor vehicle or as longitudinal leaf springs in travel direction of the motor vehicle. Coupled to the leaf springs are axle components for attachment of the wheels. When transversal leaf springs are involved, the axle components can be constructed as multilink axles or wishbone axles and kinematically coupled with an axle auxiliary frame or the vehicle body. When driving over obstacles that cause vertical movement of the wheel, the wheel is guided via the kinematic coupling and jounced or rebound via the spring force of the transversal leaf spring.

Longitudinal leaf springs assume sometimes also guiding tasks, i.e. the kinematic coupling with an axle auxiliary frame or the body in addition to the suspension tasks. Longitudinal leaf springs find oftentimes application in combination with rigid axles in which the axle is coupled on two opposing transversal leaf springs. As a result, the longitudinal leaf springs absorb forces in x, y, and z directions of the motor vehicle.

Leaf springs have been made of steel material and more recently of lightweight material for use in motor vehicles. Examples include plastics or fiber composites which have suspension characteristics that resemble those of leaf springs of steel while having considerably lighter specific weight.

Longitudinal leaf springs are installed in the motor vehicle when unbiased or at rest. When acted upon by the static wheel load, the leaf spring is tensioned. In their initial state, longitudinal leaf springs have an arched configuration, with the arched profile pointing towards the roadway in the installation position. Once installed, the longitudinal leaf springs essentially assume a straight configuration in response to the static wheel load and accompanying spring compression. When exposed to dynamic wheel forces, jouncing and rebounding cause the longitudinal leaf springs to alternate between the arched configuration, when rebounding, and the straight configuration, when jouncing.

A particular problem is encountered during braking when the leaf spring undergoes a so-called S-deflection in response to the brake moment transmitted via the axle. The leaf spring deforms hereby as a response to the brake moment in the shape of an S so that a part, called arm, of the spring already under tension as a result of the static wheel load is even further tensioned while the other part of the spring is relaxed. This is illustrated by way of example in FIGS. 1a to 1c which show simplified side views of a conventional leaf spring 1. FIG. 1a shows hereby the leaf spring 1 in its initial state when the leaf spring is at rest and not under stress and has an arched profile. When the leaf spring 1 is installed in a motor vehicle and exposed to the static wheel load, the arched profile of the leaf spring 1 is changed to a substantially linear configuration when an inner stress is present. This is shown in FIG. 1b. When now encountering a brake action, the leaf spring 1 undergoes a deformation as shown in FIG. 1c. The broken line in FIG. 1c depicts the initial state of the leaf spring (FIG. 1a). As the leaf spring 1 is acted upon by a braking moment $M_B$, a forward region 2 of the leaf spring 1 remains substantially free of stress whereas the leaf spring 1 is under much greater tension in a rearward region 3 and undergoes a significant deflection. The configuration of the leaf spring 1 resembles in longitudinal direction the shape of an S. For that reason, the braking action is labeled as S-deflection.

Exceeding a critical stress state within the spring may cause permanent damage and shorten the service life of the spring as a result of a fatigue behavior during frequent stress situations.

Leaf springs of fiber composite are oftentimes configured as components with many layers. Leaf springs encounter shear stress when the stress situation changes, causing softening of the leaf spring between the individual layers. As a result, individual fiber strands may tear or fracture or become so weakened in response to the fatigue behavior of the spring that service life is shortened.

It would therefore be desirable and advantageous to provide an improved leaf spring to obviate prior art shortcomings and to have a spring stiffness which can be maintained lastingly and suited to a stress situation during braking.

SUMMARY OF THE INVENTION

According to one aspect of the present invention, an axle suspension for a motor vehicle includes a leaf spring made of fiber composite and having ends coupled to the motor vehicle, the leaf spring being constructed in the form of a longitudinal leaf spring and having an attachment zone and two arms extending from the attachment zone to the ends of the leaf spring to define a trailing arm and a leading arm in a travel direction of the motor vehicle, with the trailing arm having a cross sectional dimension which is greater than a cross sectional dimension of the leading arm at the same distances from a center of the leaf spring, and a clamping device coupling an axle component to the leaf spring substantially in the center of the leaf spring, the clamping device being arranged offset in longitudinal direction from the center of the leaf spring.

According to another advantageous feature of the present invention, the motor vehicle axle suspension may be configured as a rigid axle suspension, with the wheels of the axle being steerable or also non-steerable.

According to another advantageous feature of the present invention, the leaf spring may be clamped on one side as longitudinal leaf spring and form part of a link suspension, in particular a multilink suspension. The axle itself or the link, i.e. the axle component, is coupled with the leaf spring via the clamping device. The clamping device may involve a shackle which embraces the leaf spring, at least in a formfitting manner and firmly arranges the axle component on the leaf spring in place in relation to the leaf spring.

The ends of the leaf spring are coupled to the motor vehicle via attachments, respectively. The leaf spring may be directly coupled to the vehicle body or may also be coupled to an axle auxiliary frame which in turn is coupled to the motor vehicle. The leaf spring may be coupled via the attachments to a ladder frame, when a utility vehicle is involved, with the superstructure being placed upon the ladder frame.

The leaf spring is configured in accordance with the invention as longitudinal leaf spring having a longitudinal orientation oriented in travel direction of the motor vehicle. The longitudinal axis of the longitudinal leaf spring may hereby deviate from the motor vehicle x-direction by up to few degrees or extend parallel to or in the motor vehicle x-direction.

In accordance with the present invention, the leaf spring has at least some regions of different cross sectional dimension along the longitudinal center axis, with the cross sectional dimensions of the regions being best suited to the expected stress situations. Thus, there is a change not only in the cross sectional geometry but also in the respective cross sectional area, i.e., number and density of fibers in longitudinal direction can change in regions. It is thus possible to best suit the spring stiffness behavior and ability to absorb stress in regions of the longitudinal leaf springs to peak stress and constant stress. The leaf spring can thus be configured with optimum weight and with appropriately suited strength properties compared to massive leaf springs of constant cross section over their length. The specific own weight of the leaf spring decreases accordingly. Overall, a leaf spring according to the present invention is lighter and lasts longer than conventional leaf springs while improving travel conditions of the motor vehicle, in particular braking behavior.

The clamping device is arranged offset from the center of the leaf spring in longitudinal direction, with the axle component being arranged in the longitudinal direction substantially in the center of the leaf spring. The clamping device is thus oriented in motor vehicle x-direction arranged offset from the center of the longitudinal leaf spring. This may be realized in positive or also negative x-direction, depending on the installation position of the axle. In this way, the clamping device is able to compensate the effects of S-deflection so that the longitudinal leaf spring is additionally stiffened in the area of encountered high shear stress. As a result, peak values of encountered shear stress are decreased and the spring has a longer service life.

To compensate S-deflection, the trailing arm of the leaf spring for a motor vehicle axle has a cross sectional dimension, as considered in the direction which is transverse to the longitudinal direction of the leaf spring, which is greater than a cross sectional dimension of the leading arm in travel direction of the motor vehicle at the same distances from the center of the leaf spring. The greater cross sectional dimension may be realized by a greater thickness and/or width of the leaf spring. Travel direction is hereby to be understood as the primary travel direction during forward travel. Thus, the cross sectional dimension of leaf spring differs, i.e. the cross sectional area of the trailing arm is greater than the cross sectional area of the leading arm. As a result, S-deflection of the longitudinal leaf spring during braking can be compensated so that upon braking during forward travel, for example at high speed, brake dive of the motor vehicle body can be counterbalanced in an optimum manner.

The motor vehicle body dives-in at the front axle so that the braking action substantially relaxes the leading arm, whereas the trailing arm of the longitudinal leaf spring is exposed to greater stress. Thus, when a front axle is involved, the trailing arm, as viewed in travel direction, has a greater cross sectional dimension than the leading arm. The same process applies when a rear axle is involved and dives from the vehicle body. It is therefore conceivable to provide the leading arm, as viewed in travel direction, of greater cross sectional dimension than the trailing arm. In absolute terms, stress is smaller on the trailing arm than stress on the leading arm of the leaf spring at the front axle as a smaller proportion of the vehicle mass pushes upon the rear axle during braking. By increasing the cross sectional area, peak loads encountered during braking can be better compensated in a desired manner, without increasing the weight of the longitudinal leaf spring.

Advantageously, the axle component is arranged substantially in the center of the clamping device, as viewed in longitudinal direction, i.e. in motor vehicle x-direction of the longitudinal leaf spring. Travel comfort and travel safety is maintained while the wheel moves during travel in positive and negative motor vehicle z-direction, much in the same way as in a conventional arrangement of the clamping device in the center of a longitudinal leaf spring. Both arms of the leaf spring are equally under stress during normal wheel movement in z-direction.

The axle component may be configured as a suspension tube, especially as a suspension tube of a rigid axle. Currently preferred is a configuration of the motor vehicle suspension of the present invention as rigid axle, with the wheels of the rigid axle being steerable or also coupled thereto without being steerable. When coupling to a front axle, the wheels are suitably steerable, and suitably not steerable, when coupled to a rear axle, in particular a driven rear axle.

The leaf spring is advantageously constructed as having an attachment zone and two arms extending from the attachment zone to the ends of the leaf spring. The attachment zone is the region of the longitudinal leaf spring intended for receiving the clamping device. Advantageously, the attachment zone has a flat configuration, especially planar configuration, so that the clamping device is in substantial or even full contact with the attachment zone.

According to another advantageous feature of the present invention, the clamping device may be coupled to the attachment zone not only formfittingly but also by a material joint, e.g. adhesive, and/or by a force fit. As a result, the clamping device is firmly secured to the leaf spring so that distortion of the leaf spring or displacement of the clamping device in relation to the leaf spring is not experienced over an entire service life of a motor vehicle or up to several 100,000 kilometers of driving in the event of a utility vehicle, and the need for axle alignment is eliminated. Two arms extend thus from the attachment zone towards their ends. As a result of the installation in longitudinal orientation, one arm of the leaf spring extends towards the vehicle front and the other arm extends towards the vehicle rear. The ends of the longitudinal leaf spring are hereby coupled to the motor vehicle via the auxiliary frame or directly to the vehicle body.

According to another advantageous feature of the present invention, the attachment zone has a cross sectional dimension which is greater than the cross sectional dimensions of the leading and trailing arms of the leaf spring. The leaf spring encounters in particular in the attachment zone high interlaminar shear stress when braking forces are introduced in the area of the clamping action in the center. The shear stress is compensated by the greater cross sectional area in the attachment zone. At the same time, the greater cross sectional area in the attachment zone may also be used to provide a greater area for attachment of the clamping device. Advantageously, the attachment zone is defined by a height which is greater than a height of the leading and trailing arms. The attachment zone may also be defined by a width which is greater than a width of the leading and trailing arms. As a result, any stress introduced into the attachment zone of both arms of the leaf spring is dispersed and compensated so that the attachment zone can be configured to optimize a force flux. Stress concentration per unit area is decreased by the greater cross sectional area. Thus, a leaf spring according to the present invention has a longer service life.

According to another advantageous feature of the present invention, the clamping device may be slideably or adjustably arranged on the attachment zone. By being able to shift the clamping device and thus the entire axle and subsequently to securely couple the clamping device with the leaf spring, benefits are realized as far as chassis tuning and toe and/or camber adjustment are concerned. Advantageously, an adjustment device may be provided between the leaf spring and the clamping device for adjustment, especially fine-tuning.

According to another advantageous feature of the present invention, the leaf spring can be produced by a resin transfer molding (RTM) process or by a prepreg process. In particular, when a RTM process is involved, a single-piece, i.e. single-layer leaf spring, can be produced so that inner stress conditions can be considered through optimization with respect to shear stress.

According to another advantageous feature of the present invention, the leaf spring may also be configured of several layers. Interlaminar stress conditions are hereby compensated by the geometric configuration. The term "several layers" is hereby to be understood as a leaf spring which can be made from several leaves stacked on top of one another and/or a leaf spring comprised of several textile layers.

According to another advantageous feature of the present invention, the attachment zone may be connected to the ends via a transition which is progressive or degressive. The transition has no edges or cross sectional jumps. The transition between the attachment zone and the respective arms eliminates the presence of a notch effect or other weakening so that vibrations as a result of continuous load does not cause fatigue or even rupture. The attachment zone can be suited in an optimum manner to encountered stress conditions, in particular with respect to shear stress.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
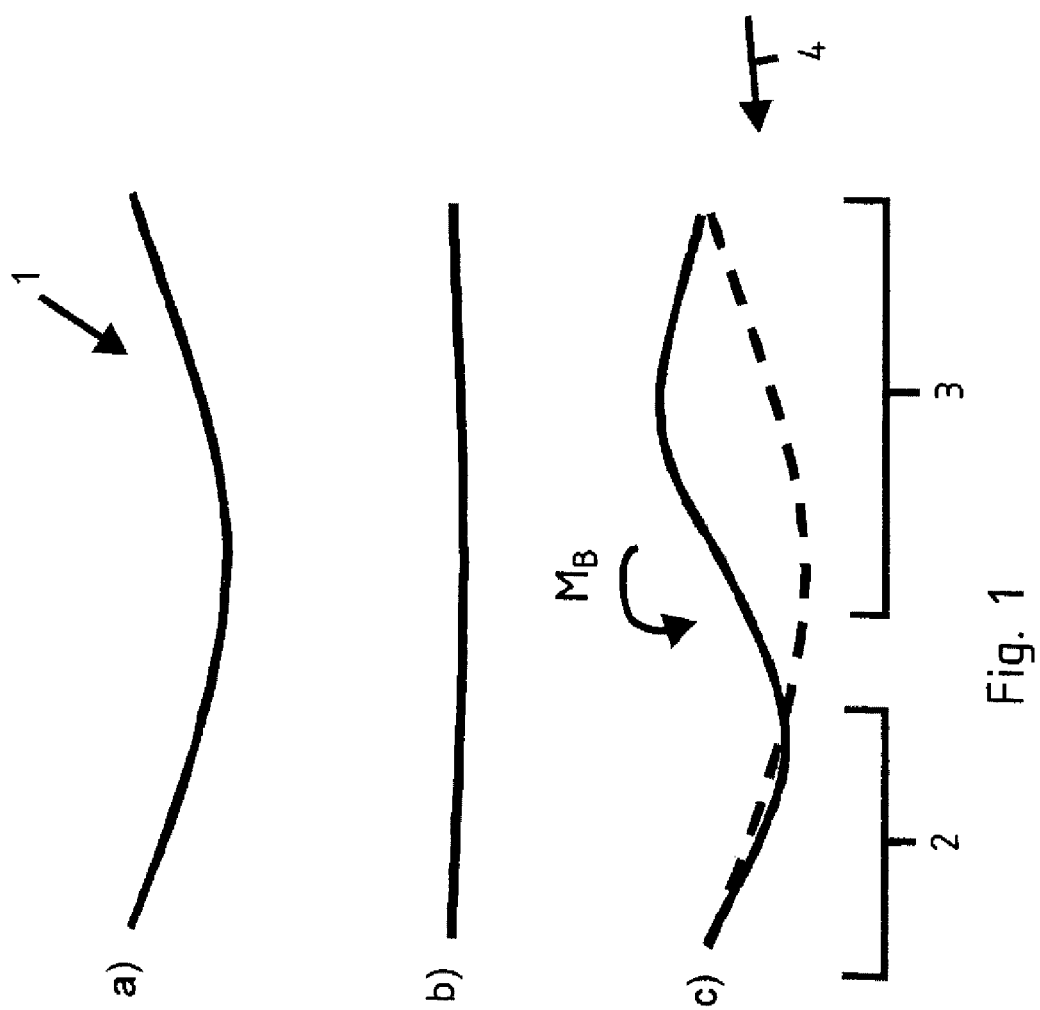
FIGS. 1a to 1c show simplified side views of a conventional leaf spring.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
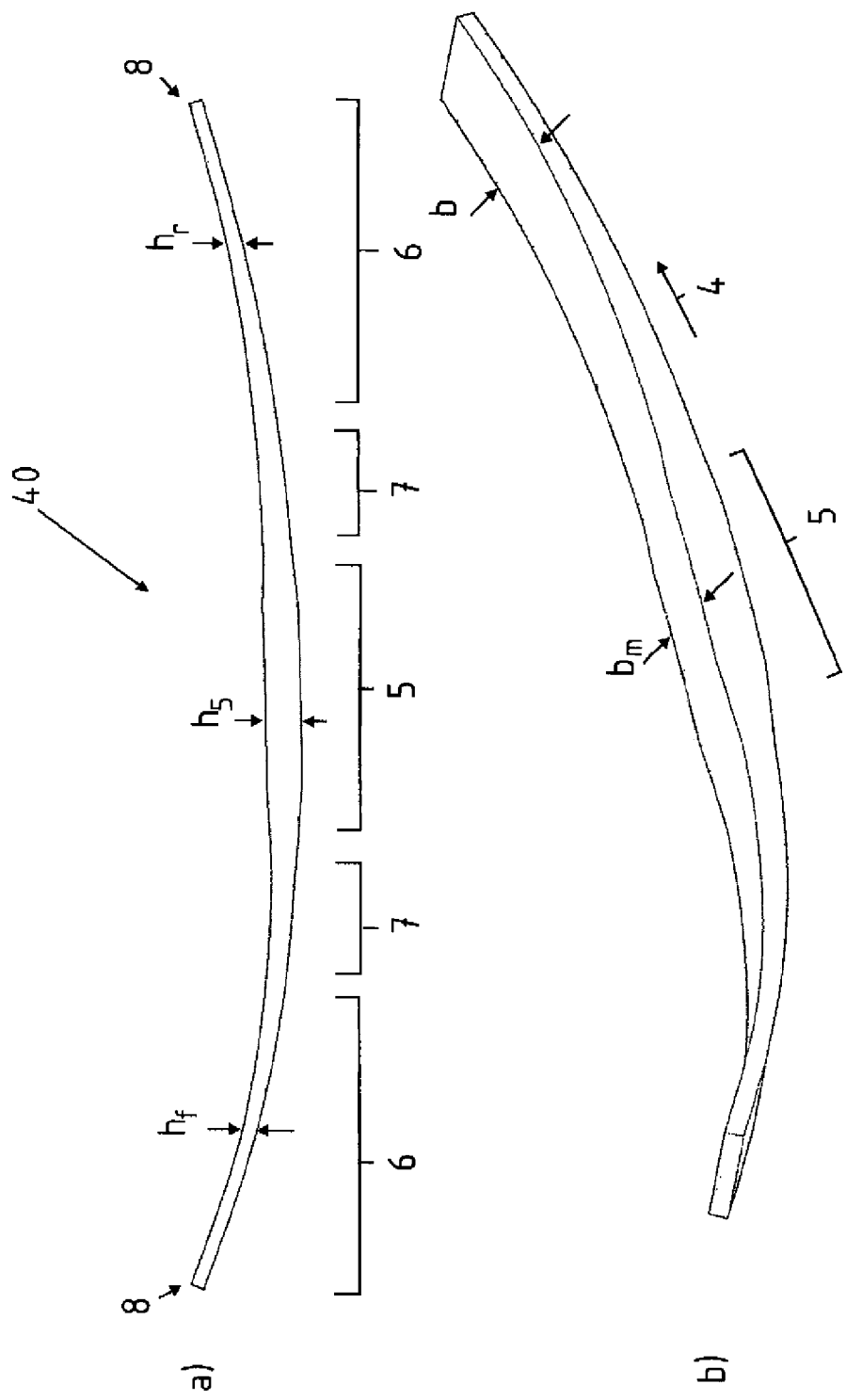
FIGS. 2a and 2b show side and perspective views of a leaf spring according to the present invention.

Turning now to FIGS. 2a and 2b, there are shown side and perspective views of a leaf spring according to the present invention, generally designated by reference numeral 40. The leaf spring 40 has an attachment zone 5 and two arms 6 extending from the attachment zone 5 to the ends 8 of the leaf spring 40 and defining in travel direction F (cf. FIG. 3b) a trailing arm on the right-hand side and a leading arm on the left-hand side of the drawing. The ends 8 of the leaf spring 40 can be used for coupling of the leaf spring 40 to a motor vehicle, not shown. The attachment zone 5 is defined by a height $h_s$ which is greater than a height $h_f$ and $h_r$ of the leading and trailing arms 6, respectively. The arms 6 can have different cross sectional dimensions. For example, as considered in a direction which is transverse to the direction of elongation of the leaf spring, the height $h_r$ of the trailing arm 6 is greater than height $h_f$ of the leading arm 6 at the same distances from the center of the leaf spring identified by line 18. The arms 6 connect to the attachment zone 5 via a transition zone 7 which is configured such that the transition zone 7 extends gradually from the height $h_s$ of the attachment zone 5 to the height $h_f$, $h_r$ of the arms 6 in the absence of any edges. As a result, there are no notch effects. The leaf spring 40 is defined by a width b which may remain constant in longitudinal direction, or the width b may also vary. For example, as shown in FIG. 3b, the attachment zone 5 has a width $b_m$ which differs from the width b of the arms 6.

Figure 3:
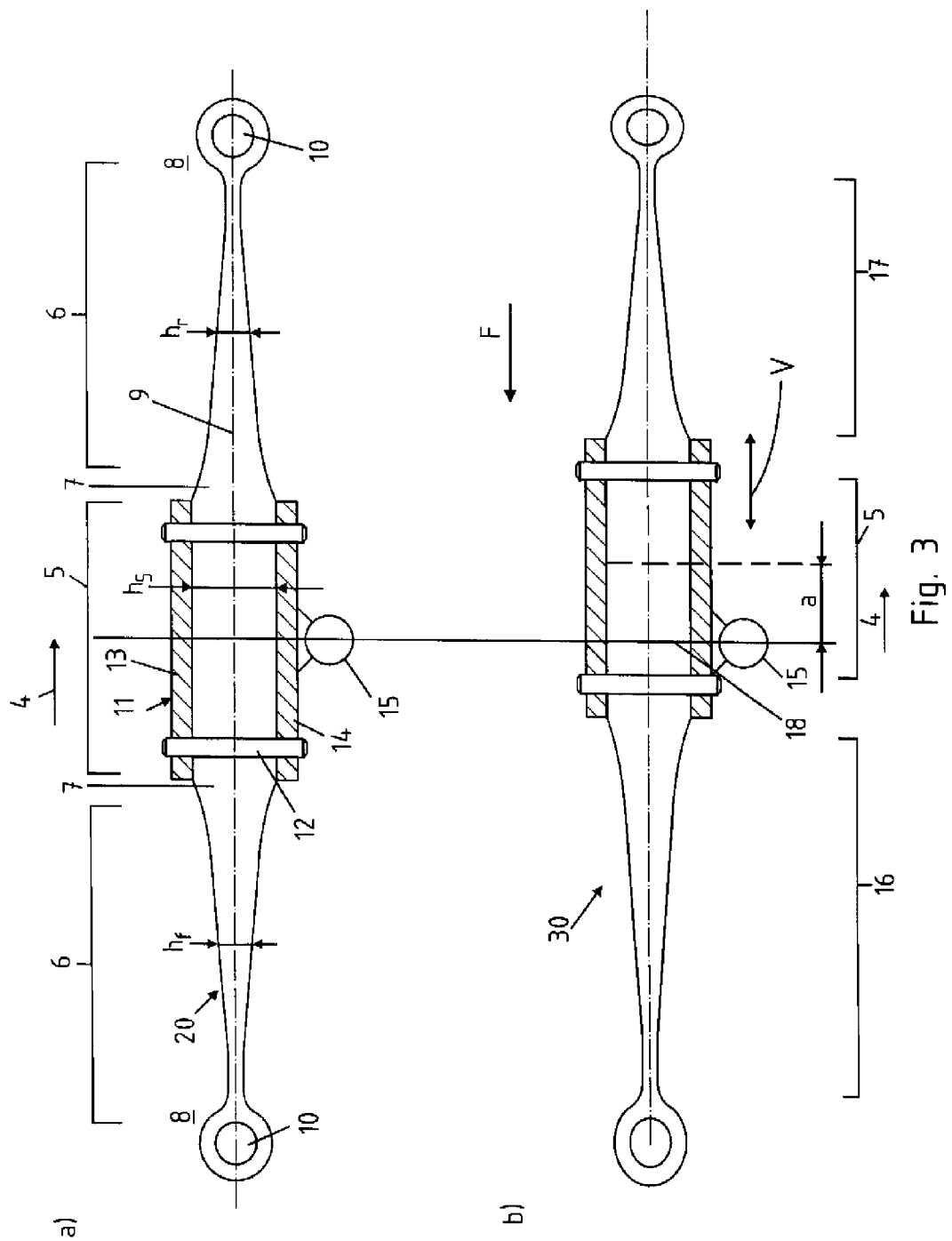
FIGS. 3a and 3b show partly sectional side views of two variations of a leaf spring according to the present invention.

FIG. 3a shows a partly sectional side view of a leaf spring according to the present invention, generally designated by reference numeral 20 and constructed in the form of a longitudinal leaf spring. Parts corresponding with those in FIGS. 2a, 2b are denoted by identical reference numerals and not explained again. The description below will center on the differences between the embodiments. In this embodiment, the leaf spring 20 has in longitudinal direction 4 along its longitudinal center axis 9 a varying cross sectional area, with the height $h_s$ of the attachment zone 5 being greater than height $h_r$ of either one of the leading and trailing arms 6. Transition zone 7 extends between the arms 6 and the attachment zone 5. In the non-limiting example of FIG. 3a, the height $h_r$ of the arms 6 decreases degressively, with their ends 8 formed with a mounting hole 10 for attachment to the motor vehicle (not shown). Further shown is a clamping device 11 having an upper plate 13 and a lower plate 14 which are connected to one another by screw bolts 12 and jointly embrace the leaf spring 20 in a form-fitting manner so as to secure the leaf spring 20 in position. Coupled to the lower plate 14 is an axle component, e.g. a suspension tube 15, which is arranged substantially in the center upon the leaf spring 1 as viewed in longitudinal direction 4.

FIG. 3b shows a partly sectional side view of another leaf spring according to the present invention, generally designated by reference numeral 30. In this embodiment, the leaf spring 30 has two arms 16, 17 of different length. As viewed in travel direction F, the leading arm 15 is hereby longer than the trailing arm 17. Compared with the leaf spring 20 of FIG. 3a, the attachment zone 5 is thus arranged eccentrically at a distance a from the center of the leaf spring 30 in longitudinal direction 4.

The suspension tube 15 is also arranged eccentrically to the clamping device 11 such as to be positioned in the center of the leaf spring 30 as viewed in longitudinal direction 4. Depending on the selection between front axle and rear axle, the longer leading arm 16 or the shorter trailing arm 17 points in the primary forward travel direction. Advantageously, the clamping device 11 can be slideably or adjustably arranged on the attachment zone 5, as indicated by double arrow V.

By way of example, FIG. 3b shows the leaf spring 30 at a front axle so that the arm 16 is oriented in travel direction F forwardly, whereas the arm 17 is oriented in travel direction F backwards. In an arrangement of a rear axle, the leaf spring 30 is arranged as a mirror image so that the longer arm 16 points in reverse travel direction towards the vehicle end.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An axle suspension for a motor vehicle, comprising:
   a leaf spring made of fiber composite and having ends coupled to the motor vehicle, said leaf spring being constructed in the form of a longitudinal leaf spring and having an attachment zone and two arms extending from the attachment zone to the ends of the leaf spring to define a trailing arm and a leading arm in a travel direction of the motor vehicle, with the trailing arm having a cross sectional dimension which is greater than a cross sectional dimension of the leading arm; and
   a clamping device coupling an axle component to the leaf spring substantially in a center of the leaf spring, said clamping device being arranged offset in a longitudinal direction of the leaf spring from the center of the leaf spring, wherein the trailing arm of said leaf spring has a greater cross-sectional height than the leading arm of said leaf spring as considered in a direction which is transverse to the longitudinal direction of the leaf spring and at same distances from the center of the leaf spring.

2. The axle suspension of claim 1, constructed for use with a front axle.

3. The axle suspension of claim 1, wherein the attachment zone has a cross sectional dimension which is greater than the cross sectional dimensions of the leading arm and the trailing arm.

4. The axle suspension of claim 1, wherein the attachment zone is defined by a height which is greater than a height of the leading and trailing arms.

5. The axle suspension of claim 1, wherein the attachment zone is defined by a width which is greater than a width of the leading and trailing arms.

6. The axle suspension of claim 1, wherein the clamping device is slideably or adjustably arranged on the attachment zone.

7. The axle suspension of claim 1, wherein the leaf spring is produced by a resin transfer molding (RTM) process or by a prepreg process.

8. The axle suspension of claim 1, wherein the leaf spring is comprised of several layers.

9. The axle suspension of claim 1, wherein the attachment zone is connected to the ends via a transition zone which is progressive or degressive in cross section.

10. The axle suspension of claim 1, wherein the attachment zone is resistant to shear stress, when the leaf spring is produced by an RTM process.

11. The axle suspension of claim 1, wherein the axle component is a suspension tube.

12. The axle suspension of claim 11, wherein the suspension tube is part of a rigid axle.

13. The axle suspension of claim 11, wherein the suspension tube is part of a driven live axle.

* * * * *